Nov. 12, 1963    D. L. FAUSER ET AL    3,110,808
CHARGED FIBRE RADIATION RATEMETER
Filed March 30, 1960    5 Sheets-Sheet 1
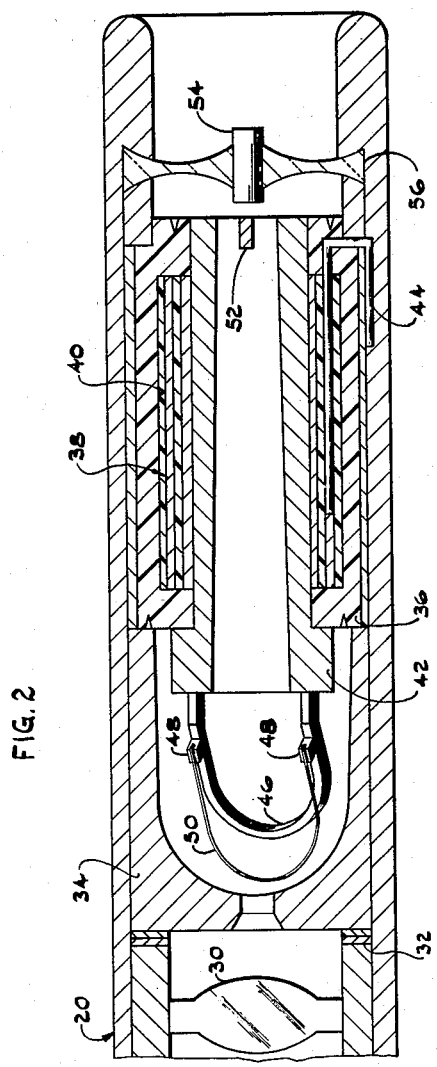
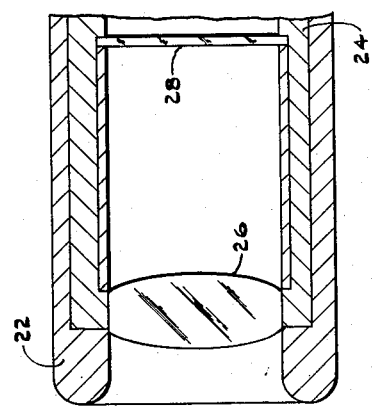
INVENTORS.
DONALD L. FAUSER
CARL R. SIEBENTRITT JR.
BY WARREN H. SMITH
WILLIAM R. POLYE
ATTORNEY Nov. 12, 1963 D. L. FAUSER ET AL 3,110,808
CHARGED FIBRE RADIATION RATEMETER
Filed March 30, 1960 5 Sheets-Sheet 2

CALIBRATION CURVE
EXPERIMENTAL RATEMETER

INVENTORS.
DONALD L. FAUSER
CARL R. SIEBENTRITT JR.
BY WARREN H. SMITH
WILLIAM R. POLYE

Richard J. Seeger
ATTORNEY

Nov. 12, 1963 D. L. FAUSER ET AL 3,110,808
CHARGED FIBRE RADIATION RATEMETER
Filed March 30, 1960 5 Sheets-Sheet 3

INVENTORS.
DONALD L. FAUSER
CARL R. SIEBENTRITT JR.
BY WARREN H. SMITH
WILLIAM R. POLYE

Richard J. Seeger
ATTORNEY

Nov. 12, 1963  D. L. FAUSER ET AL  3,110,808
CHARGED FIBRE RADIATION RATEMETER
Filed March 30, 1960   5 Sheets-Sheet 5

INVENTORS
DONALD L. FAUSER
CARL R. SIEBENTRITT JR.
BY WARREN H. SMITH
WILLIAM R. POLYE

*Richard J. Saeger*
ATTORNEY

United States Patent Office 3,110,808
Patented Nov. 12, 1963

3,110,808
CHARGED FIBRE RADIATION RATEMETER
Donald L. Fauser, Lakewood, Carl R. Siebentritt, Jr., Cincinnati, and Warren H. Smith, Morrow, Ohio, and William R. Polye, River Ridge, N.J., assignors to The Bendix Corporation, a corporation of Delaware
Filed Mar. 30, 1960, Ser. No. 18,533
22 Claims. (Cl. 250—83.3)

This invention pertains to a radiation ratemeter which is simple in operation and construction, inexpensive to manufacture, and small in size.

More particularly, this invention pertains to a simplified high energy radiation ratemeter which measures the present radiation rate in roentgens per hour and returns to zero between measurements.

It is an essential object of this invention to provide an inexpensive, simple, and portable meter for measuring high energy radiation so that the meter reading gives present radiation value and not a cumulative value.

It is an object of this invention to provide a radiation ratemeter having a quasi-logarithmic response to radiation rates with meter movement at lower radiation rates being greater than meter movement at higher radiation rates.

It is a further object of this invention to provide a ratemeter having a low time constant between radiation received and meter deflection, or, in other words, a fast reacting meter.

It is an object of this invention to provide a ratemeter having a U-shaped frame with a thin fibre attached to each end of the U, and means for charging the frame and fibre at a given potential so that the fibre will be deflected from the frame by a given amount corresponding to the range desired for the meter, with the fibre having a substantially larger resistance to the flow of electrical current than the frame so that upon ionization of the air surrounding the frame and fibre by radiation to be detected, ions will flow to the frame and fibre establishing a current therein with the potential drop in the fibre being greater than the potential drop in the frame resulting in a difference of potential between the frame and fibre for a given radiation and a corresponding difference in the deflection between the frame and fibre.

It is a further object of this invention to provide a conductive tube as the outer housing for the ratemeter described in the previous paragraph, an eyepiece lens system incorporating a reticle or scale which is inserted into the tube and aligned with the fibre to measure the displacement of the fibre, and a condenser connected to the frame and fibre to establish the initial charge causing the separation therebetween.

It is another object of this invention to provide in such a ratemeter a second fibre connected in parallel to the first fibre but having a much lower resistance than the first fibre to measure the discharge of the condenser and indicate the departure in the ratemeter reading due to any condenser discharge.

A further object of this invention is to provide a ratemeter that receives its charge from a condenser, a compensating chamber also subject to the radiation, and having an ion receiving member, which has a condenser connected to the ion receiving member and discharged by the ion receiving member during radiation with the discharge of the compensating chamber condenser serving to charge the ratemeter chamber condenser.

Another object of this invention is to provide a ratemeter having a frame and attached fibre which is charged initially by a radioactive source internally of the ratemeter with a frame connected resistance to ground for stabilizing the charge on the frame and fibre.

It is a further object of this invention to provide a frame and fibre which is brought to its initial charge by a battery such as a solid ion battery.

Another object of this invention is to provide a frame and fibre connected to the charging means through a resistive collar with potential drop across the collar during ion flow causing a quasi-logarithmic type deflection of the fibre in response to radiation, with a bypass assembly which is engageable to connect directly the charging unit and frame and fibre to momentarily read the charge on the charging unit.

These and other objects and advantages will become more apparent when preferred embodiments of this invention are considered in connection with the drawings in which:

FIGURE 1 is a perspective view of a ratemeter of this invention;

FIGURE 2 is a section taken along the longitudinal dimension of the ratemeter shown in FIGURE 1;

Figure 3:
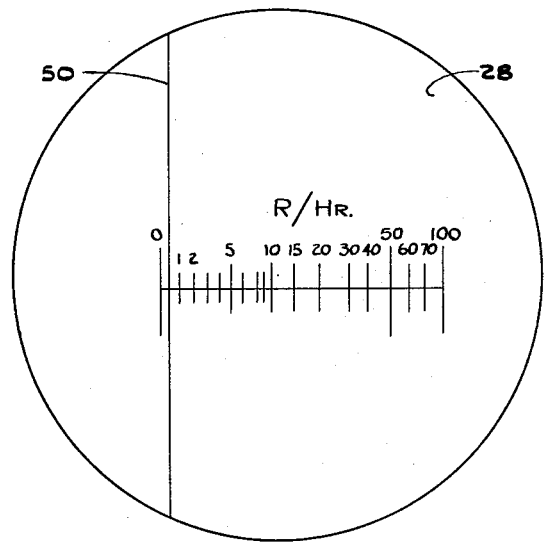
FIGURE 3 is a view of the ratemeter fibre as it appears through the eyepiece assembly against the scale of the reticle.

In the drawings, and particularly FIGURES 1 to 3, is shown a ratemeter having an outer housing 20 formed of a conductive material such as an aluminum or magnesium alloy or conductive plastic, having a low atomic number and thickness to decrease absorption of low energy electromagnetic radiation. In this embodiment, the housing 20 has an outer diameter of .5 in., and a wall thickness of .015 in. in the radiation receiving area and .030 in. near the end areas, and a length of 4.5 in. While housing 20 is circular in cross-section, it, of course, may have other cross sectional areas. At the left end of housing 20 is a boss 22 which provides a retaining seat for the eyepiece assembly 24 which is also tubular in configuration and fits closely inside housing 20. Attached to one end of assembly 24 is eyepiece lens 26, which is part of a hermetic seal at the tube end, and spaced a distance therefrom is reticle 28 (FIGURE 3) which has scale markings in roentgens per hour quasi-logarithmically spaced, with the spacing at the low scale end being greater than the spacing at the high scale end. At the other end of assembly 24 is attached an objective lens 30. Spaced from eyepiece assembly 24 by spacers 32 which can be adjusted for proper focusing, is concave ionization chamber insert 34 which may be made from a phenolic plastic having graphite particles interspersed to make the insert conductive. Other electrically conductive materials having low atomic numbers may be used. Also inserted in housing 20 is tubular insulator 36 which is formed of a radiation resistant, highly insulating material and which abuts the end of chamber insert 34. A condenser 38 formed of alternate layers of insulative and conductive materials is wrapped inside a center recess 40 of insulator 36 with the innermost layer being conductive and in surface contact with a conductive sleeve 42 which fits centrally in and is supported by insulator 36. Attached to a conductive layer of condenser 38 which is separated from the innermost layer by an insulative sheet is a grounding member 44 for making electrical contact with housing 20. The capacitance of condenser 38 should be as large as possible and, in embodiments later described, ways of adding capacitance are shown. A capacitance of .01 microfarad for rate change of 50 roentgens per hour to 100 roentgens per hour has been used.

Inserted in one end of sleeve 42 is a U-shaped frame 46 formed of a conductive material and having a pair of lugs 48 near each end in which are crimped the ends of a very fine fibre 50 having a quartz or borosilicate glass core with a metallic coating such as platinum or gold sputtered electrically or otherwise provided with a predetermined ohmage and being of the same general configuration as frame 46. The resistance for a rate range corresponding to 100 roentgens per hour is $1.2 \times 10''$ ohms for an ionization chamber volume of 0.5 cubic centimeter. Of course, frame 46 may assume other configurations than that shown. The ohmage of the wire is selected to correspond with the desired scale readings of the instrument with higher ohmage resulting in larger scale deflection for a given radiation.

In the relaxed position fibre 50 assumes an approximately parallel position to frame 46. In the position shown, fibre 50 is in its most extended position due to the fact that a voltage of approximately 150 volts is placed on the frame 46 by condenser 38 through conductive sleeve 42. A high voltage of the same polarity on both the frame and fibre causes a mutual repelling force and in the position shown the fibre 50 is at maximum deflection and indicates a reading of zero roentgens per hour on the scale of reticle 28. As will be later explained, radiation will cause current flow in the fibre 50 and a resulting potential gradient along the fibre from the center to the fibre ends. The potential at the fibre center during current flow will be lower than the frame potential and, therefore, will reduce the repelling force and lessen fibre deflection with a corresponding increase in radiation reading.

Formed in the right end of sleeve 42 is a transverse conductive bar 52 and aligned with bar 52 is a charging pin 54 which is held in axial alignment by a resilient disc 56. Disc 56 permits longitudinal movement of pin 54, is of transparent, insulative material, and is hermetically sealed at its outer periphery to housing 20. The pressure in the ratemeter is atmospheric but it could, of course, be varied to suit a particular condition. The purpose of resiliently mounting pin 54 is to permit a convenient charging method for condenser 38. A high potential positive terminal of a direct current charging battery is pressed into contact with pin 54 with sufficient force until it makes electrical contact with bar 52 and at the same time the negative terminal is connected to housing 20 until condenser 38 is sufficiently charged.

OPERATION

In the operation of this embodiment the condenser 38 is charged to approximately 150 volts by pressing the positive terminal of a 150 volt potential source against charging pin 54 until it makes contact with bar 52 and connecting the negative terminal of the source to the housing 20. This causes a potential of some 150 volts of the same polarity to be applied to frame 46 and fibre 50, which mutually repel one another, resulting in maximum deflection of fibre 50. The fibre maintains this maximum deflection, or deflection which corresponds to a zero reading on the roentgen scale, until radiation occurs. When the instrument is in the presence of radiation, insert 34 will, due to secondary radiation, emit particles which will ionize the air in the ionization chamber surrounding frame 46 and fibre 50. Since both these members have a high positive charge they will attract the negative ions or electrons and a current will flow therein. However, since the fibre 50 is of a resistive material, a potential drop will occur from the center of the fibre toward each end of the fibre with the center point falling in voltage by an amount corresponding to the current flow. Due to this decrease in voltage the repelling forces between the frame and the fibre will become less and the fibre will move towards the frame an amount corresponding to the radiation. This change in the position of fibre 50 can be measured by looking through eyepiece assembly 24 and noting the position of the fibre in relation to the scale on reticle 28 and the radiation can be determined.

Figure 4:
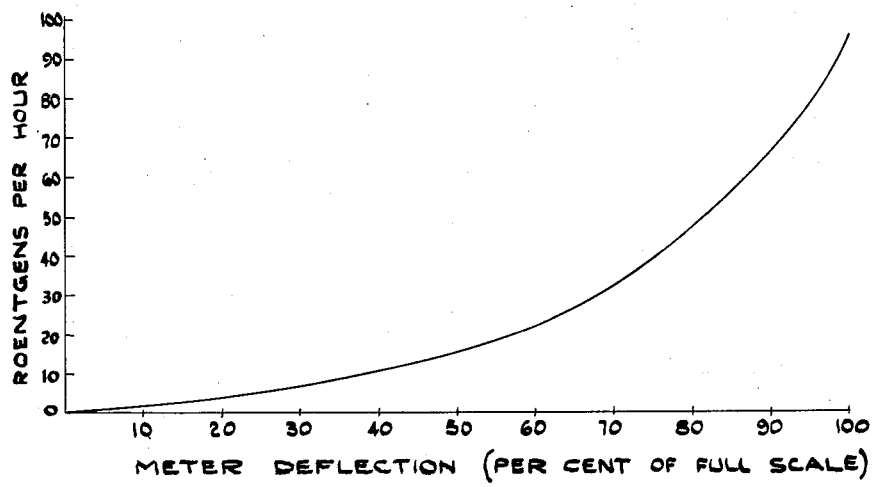
FIGURE 4 is a curve showing the logarithmic response of the fibre deflection versus the radiation rate in roentgens per hour.

If the electrons were attracted to the fibre 50 and the frame 46 in the same proportion for all radiation rates, the deflection of fibre 50 would be linear with the change in rate of radiation. However, since the fibre becomes lower in potential as the radiation rate increases, it will attract a smaller percentage of the available electrons and, therefore, its potential change will be less and it will have a smaller deflection per change in radiation. This results in a quasi-logarithmic curve between scale deflection and radiation as shown in FIGURE 4.

Also, since the capacitance of fibre 50 is so small, the resistance-capacitance product, or time constant, of the fibre will be smaller and, therefore, a faster reaction time is available between a given radiation and the corresponding fibre deflection.

Figure 5:
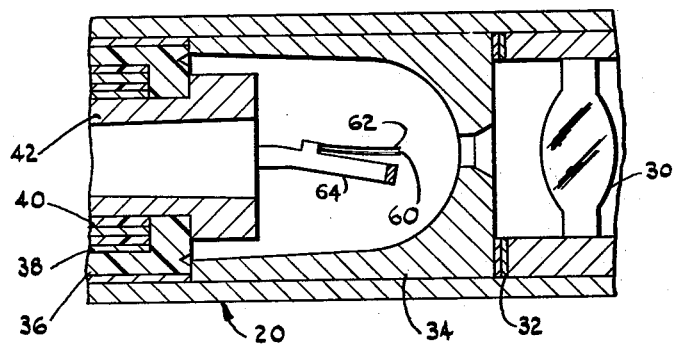
FIGURE 5 is an enlarged section of a second embodiment having two fibers and supplementary condensers.

Embodiment Shown in FIGURE 5

Figure 6:
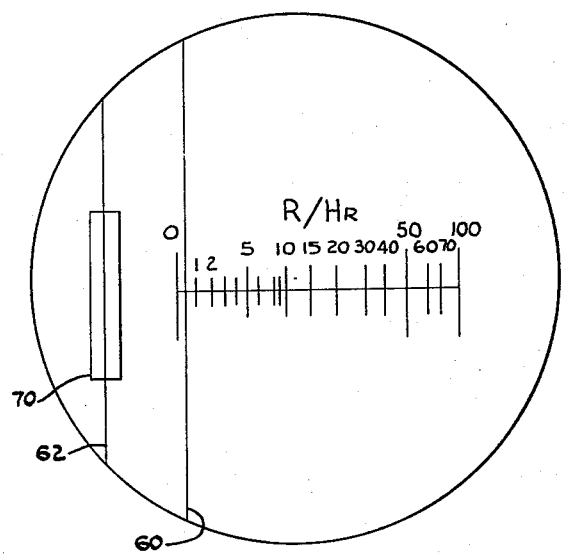
FIGURE 6 is an enlarged view of the reticle or scale for the embodiment of FIGURE 5.

In FIGURE 5 is shown a second embodiment of similar construction to the embodiment shown in FIGURES 1–3. It is different insofar as there are two fibres 60 and 62 attached to a frame 64 with fibre 60 being similar to fibre 50 and being of a substantially higher resistance than frame 64, and fibre 62 being metal coated to a very low resistance value. Fibres 60 and 62 would appear against the reticle scale of the second embodiment in a manner shown in FIGURE 6. Since fibre 62 is of a very low resistance, on the order of frame 64, the deflection or repelling force between frame 64 and fibre 62 will remain the same, regardless of radiation, unless the amount of charge on capacitor 68 changes. If the capacitor becomes discharged, the fibre 62 will move closer to frame 64 since there is a smaller repelling force between them. This will cause fibre 62 to vary from its center position on the box 70 of the reticle scale indicating that the capacitor 68 has become discharged and the amount of the discharge. The reading of fibre 60 should then be corrected correspondingly. When the condenser discharge reaches a certain point, it should be recharged. An instrument having a .002 microfarad condenser charged to 180 volts may be exposed to 5 roentgens per hour for 20 hours and the error or discharge of the condenser will be less than 5% of full scale reading.

Figure 7:
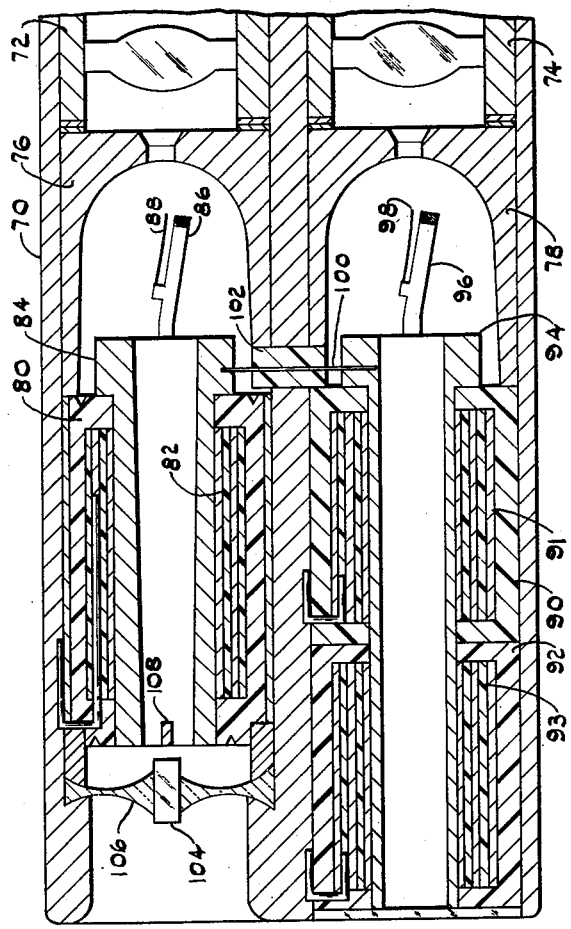
FIGURE 7 is a partial sectioned view of an embodiment having two tubes with the first tube containing a frame with a fibre of high resistance, and the second tube containing a frame and fibre with a low resistance and also containing additional capacitors for increasing the capacitance of the assembly.

Embodiment Shown in FIGURE 7

In FIGURE 7 is shown an embodiment having a condenser discharge indicator and an extra bank of condensers for maintaining adequate voltages for longer periods of time.

In FIGURE 7 is a housing 70 containing dual eyepiece assemblies 72, 74 which abut, respectively, inserts 76, 78, which are made of conductive materials of low atomic number. Axially aligned with and adjacent to insert 76 is an insulator 80 which encloses a capacitor 82 having one plate grounded and a second plate or layer of conductive foil in contact with a conductive sleeve 84 which supports U-shaped frame 86 to which is crimped a U-shaped "resistive" fibre 88 or a fibre having a resistance substantially more than its attached frame. In the second or lower barrel adjacent to and axially aligned with insert 78 are a pair of cylindrical insulators 90, 92, each of which contains a condenser 91, 93 with one conductive layer grounded and a second conductive layer in surface contact with a conductive sleeve 94 which supports a U-shaped frame 96 to which is crimped a U-shaped "conductive" fibre 98 or a fibre that has a resistance substantially the same as its attached frame. Connecting conductive sleeves 84 and 94 is a conductive strip 100 which is supported by insulation 102. The condensers 82, 91 and 93 are electrically connected to increase the capacitance available to the frames 86, 96. Since fibre 88 is resistive, it will act as a ratemeter in the manner previously described. Since fibre 98 is conductive it will measure the charge on the capacitors 82, 91, 93 and indicate the degree of discharge and corresponding adjustment which should be made to the reading given by fibre 88. When the capacitors reach a predetermined degree of discharge then all may be charged by putting a high potential source against charging pin 104 which is supported by a transparent, flexible disc 106 until pin 104 contacts a transverse bar 108 which is connected to conductive sleeve 84. The negative pole of the high potential source is connected to the conductive housing 70.

Figure 8:
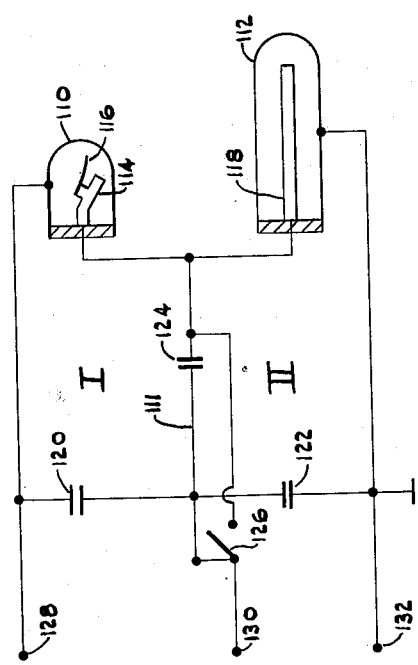
FIGURE 8 is a schematic diagram of an embodiment having a compensating chamber and circuit for charging the ratemeter chamber condenser.

*Embodiment Shown in FIGURE 8*

The embodiment of FIGURE 8 has two chambers subject to radiation, with one chamber acting as a compensator to charge the capacitor for the other chamber during radiation and, therefore, reduce the frequency of capacitor charging by an external source such as a battery.

In FIGURE 8 is seen a schematic drawing wherein chambers 110, 112 represent enclosures which are simultaneously subject to radiation. Chamber 110 has therein a frame 114 and resistive fibre 116 while chamber 112 has an electron pick-up strip 118. An electrical circuit comprising loop I, which is connected at one terminal to the frame 114-fibre 116 combination and at the other terminal to the outer conductive portion of chamber 110, has a common leg 111 with loop II which has one terminal connected to strip 118 and the other to the outer conductive housing of chamber 112; a capacitor 120 is placed in one leg of loop I and a capacitor 122, having a capacitance much greater than that of capacitor 120, is placed in a corresponding leg of loop II. A capacitor 124, being approximately equal in capacitance to that of condenser 120, is placed in the common leg 111 between loops I and II. A charging switch 126 bypasses capacitor 124 when the switch is closed. During charging by a battery or other member, not shown, a high positive potential is placed on terminal 128, an intermediate potential is placed on terminal 130 and a low potential is placed on terminal 132 with the potential between terminals 128 and 130 being the same as that between 130 and 132. Switch 126 is closed during charging and opened after charging.

During operation of this embodiment, radiation causes ionization of the air in the chambers 110, 112 and a current flows clockwise in loops I and II with the current going in opposite directions along the common leg 111 containing capacitor 124. The capacitor discharge in loop I is compensated for by the capacitor discharge in loop II.

Figure 9:
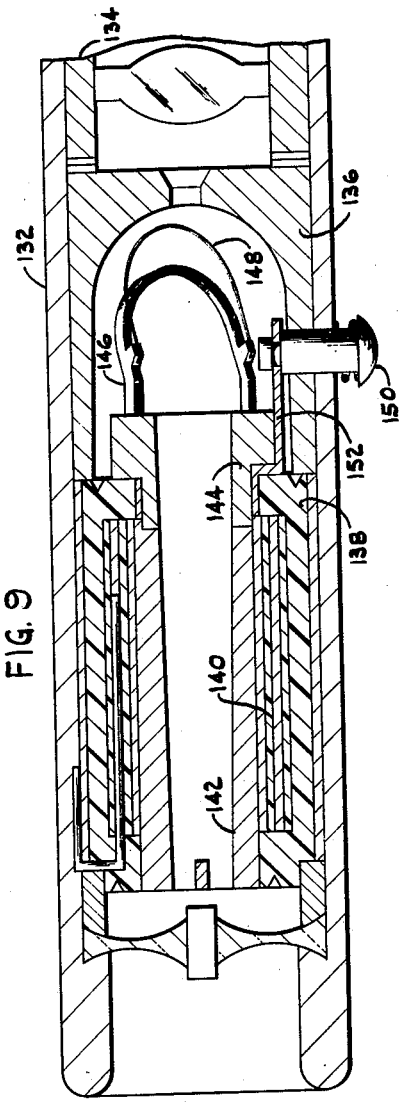
FIGURE 9 is a partial sectioned view of an embodiment having a frame with a fibre of low resistance and a resistive collar between the frame and the charging unit.

*Embodiment Shown in FIGURE 9*

In FIGURE 9 is seen a further embodiment wherein the frame and fibre are conductive and a collar of resistive material supports the frame-fibre combination and is in electrical contact with one plate of the condenser. Also shown is a spring loaded pushbutton for electrically bypassing the resistive collar and for indicating the zero point or charge on the condenser.

A housing 132 of conductive low atomic number material supports an eyepiece assembly 134, an ionization chamber insert 136 also comprised of a conductive low atomic number material, and a tubular insulator 138 enclosing a capacitor 140 having one conductive layer grounded and the inner conductive layer in contact with a conductive sleeve 142. Fitted against sleeve 142 is a resistive collar 144 which supports frame 146 to which is crimped conductive fibre 148 coated with a conductive material to a very low resistance. A spring-loaded pushbutton 150 is inserted through the wall of housing 134 and insert 136 and is so dimensioned that during inward movement it will contact conductive frame 146. Also in contact with button 150 is a conductive strip 152 which is connected to the innermost conductive layer of condenser 140. It can be seen that when button 150 is pushed inwardly it and strip 152 will provide an electrical path of reduced resistance bypassing collar 144.

In the operation of this embodiment, condenser 140 is charged to cause separation between fibre 148 and frame 146. Insert 136 emits secondary radiation when subject to a radiation field, ionizing the air about frame 146, fibre 148 and collar 144. Since these members are at a high potential, they will attract the electrons causing a current flow therethrough and a potential drop across collar 144. Due to the potential drop and lowering of potential at the frame end of collar 144, the collar will absorb electrons in a different manner than previously, thereby resulting in a logarithmic response curve between the radiation received and deflection of fibre 148. Upon removal of the radiation field, fibre 148 will return to its zero position. The accuracy of the zero position can be checked at any time by pressing button 150 which bypasses resistive member 144 and places the full charge of capacitor 140 on the frame and fibre assembly to allow checking of the zero point and, hence, the charge of the condenser, in a radiation field.

Figure 10:
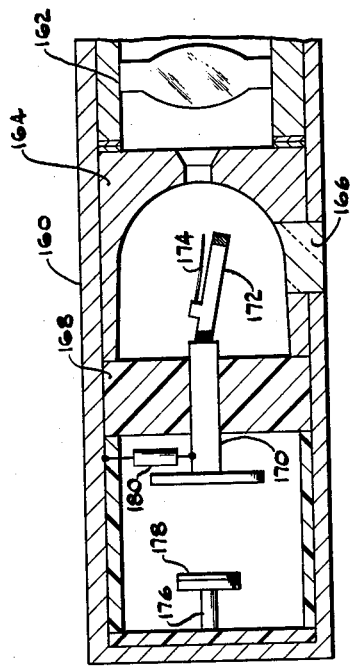
FIGURE 10 is a partial sectioned view of an embodiment wherein the frame and fibre are charged by a radioactive source.

*Embodiment Shown in FIGURE 10*

In the embodiment shown in FIGURE 10 the means for charging the frame and fibre is an alpha particle emitting radioactive source. The collector of the alpha particles is grounded by a resistor to the housing so that the maximum potential of the collector will be determined by the potential drop across the resistor during equilibrium flow of current between the collector and the housing.

A housing 160 of conductive low atomic number material encloses an eyepiece assembly 162, shown in part and similar to the previously disclosed eyepiece assemblies, a concave chamber insert 164 having a light plug 166, of some transparent material such as Plexiglas, formed therein extending through the insert 164 and housing 160, an insulative disc 168 supporting a conductive collector 170 which in turn supports a conductive frame 172 and a fibre 174 is clinched thereto and has a core of insulative material sputtered with a conductive material to achieve a resistance which is substantially higher than the frame resistance. An insulative base 176 is attached to the outer housing 160 and is coated with an alpha particle emitting surface 178 such as polonium, and a resistance 180 in the order of $10^{12}$ ohms connects the collector 170 and the housing 160.

In the operation of this embodiment the initial charge is supplied to frame 172 and 174 through the alpha emitting source 178. The alpha particles, each carrying the positive equivalent of twice the charge on an electron, are collected by collector 170. The potential of collector 170 would continue to increase as it receives additional positive charges if it were not for the resistance 180 through which is established an equilibrium current allowing the electrons from the housing 160 to pass therethrough. The charge of collector 170, therefore, is limited to the potential drop across resistor 180 during this current flow. During radiation, ionization, and ion reception by the frame 172 and fibre 174, as in previous embodiments, the collector 170 becomes slightly discharged but this charge is quickly supplied by the alpha particle source 178 to maintain at all times the collector 170 at the desired potential.

In a variation of this embodiment, the fibre 174 has a resistance substantially equal to the frame 172 resistance so that the deflection of the fiber corresponds to the difference between the charge supplied by the ions formed in the concavity of insert 164 which are attracted to the frame and fibre, and the charge supplied by collector 170. By keeping the charge supplied to collector 170 from radioactive source 178 at a very low level, the meter can detect very low radiation rates. In the operation of this last described variation, at full charge the conductive fibre 174 will be at maximum deflection and when the meter is subject to radioactivity the area about the frame and fibre would become ionized, causing a current flow which will reduce the potential of the frame and fibre so that their mutual repelling force and fibre deflection will be smaller. After the meter has been removed from the radiating area the collector 170 will receive sufficient charge from surface 178 to bring the frame 174 and fibre 172 to full charge and deflection.

Figure 11:
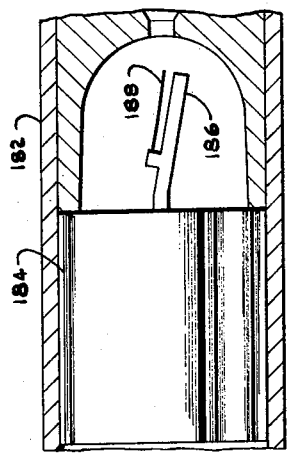
FIGURE 11 is an embodiment where the frame and fibre are charged by a battery source.
Figure 7A:
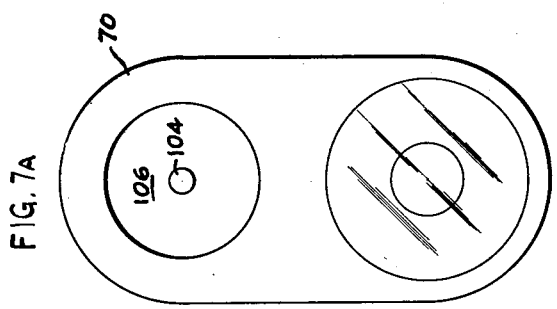
FIGURE 7A is an end view of the embodiment shown in FIGURE 7.

Embodiment Shown in FIGURE 11

In this embodiment, an outer housing 182 encloses a solid ion battery 184 such as disclosed in Patent No. 2,623,184, issued to D. J. Montgomery et al., on December 23, 1952, or other battery source, which is directly connected to a conductive frame 186 and attached resistive fibre 188. The potential on the frame and fibre is maintained constant by the battery 184.

As a variation of this embodiment, the fibre 188 is conductive and of approximately the same resistance as frame 186 so the deflection of the fibre corresponds to the difference between the charge supplied by the ions formed by the radiation and the charge supplied by battery 184. Upon exposure to radiation, the ions formed will be attracted to the frame and fibre which will change in potential approximately equally so that the mutual repelling force and deflection of fibre 188 becomes less. After the radiation is removed, the current from battery 184 will again charge the frame and fibre to their original values to establish initial deflection. The lower the charge from battery 184 applied to the frame and fibre, the smaller is the radiation rate which can be read.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A ratemeter for detecting radiation comprising chamber means, conductive frame means situate in said chamber means, resistive fibre means being flexible and being connected to said frame means, said fibre and frame means having a predetermined difference in resistive values so that when said frame and fibre means are subject to electrical current flow, the potential of one will differ from the other and their relative position will correspondingly change, due to the difference in potential drops along said fibre and frame means.

2. The apparatus of claim 1 wherein said fibre means comprises an insulative core sputtered with a metallic, conductive coating to give the fibre the desired resistance.

3. The apparatus of claim 2 wherein said core is a borosilicate glass.

4. The apparatus of claim 1 with voltage means being connected to each end of said fibre and frame means to place said frame and fibre at a predetermined voltage thereby causing a repelling force and a predetermined separation therebetween.

5. The apparatus of claim 4 where said voltage means is at least one capacitor.

6. The apparatus of claim 4, said voltage means being a radioactive source a member for receiving charged particles from said radioactive source, said member being connected to said frame and fibre means, a grounded resistance being connected to said member to limit the voltage of said member to the product of the value of said resistance in ohms and the current through said resistance in amperes.

7. The apparatus of claim 1 having second fibre means of substantially less resistance than said first fibre means, said second fibre means being connected to said frame means, the repelling force between said second fibre means and said frame being proportional to the charge of said voltage means.

8. A ratemeter for detecting radiation comprising a housing, chamber means, voltage means being attached in said housing, resistive mounting means being connected to said voltage means, frame means being attached to said mounting means, flexible fibre means being attached to said frame, said frame and fibre means receiving energy from said voltage means through said resistive means with said frame, fibre and resistive means being exposed to the ions established by radiation to be detected, the deflection of said fibre means being in a quasi-logarithmic ratio to the radiation due to the potential drop across said resistive means during current flow therein.

9. The apparatus of claim 8 having a conductive member engageable with said frame and fibre means and said voltage means to bypass said resistive means and measure charge of said voltage means.

10. The apparatus of claim 5 having a compensating chamber housing subject to radiation, means in said chamber to receive ions resulting from ionization of chamber air by radiation, second capacitor means being connected to said chamber housing and said ion receiving means in said chamber, third capacitor means being connected to said second capacitor means and one of said frame and the first chamber means so that the discharge of the second capacitor during ion flow during radiation will charge the third capacitor means and tend to keep the voltage between said frame and first chamber constant.

11. The apparatus of claim 10 where said first capacitor is connected to said first chamber means and said frame to form a first loop and said second capacitor means is connected to said compensating chamber and ion receiving means to form a second loop, said loops having a common leg having said third capacitor with the current flow in said common leg from said loops being in opposite directions.

12. The apparatus of claim 11 having switching means for shorting said third capacitor during charging.

13. The apparatus of claim 10 having a first charging terminal connected to one plate of said first capacitor, second charging terminal connected to said second plate of said first capacitor, and third charging terminal connected to one plate of said second capacitor.

14. A radiation ratemeter comprising a tubular housing of conductive low atomic number material, an eyepiece assembly comprising, in longitudinally spaced relation, an eyepiece lens, a reticle and an objective lens, said eyepiece assembly being inserted in said tube, said eyepiece lens forming a hermetic seal at one tube end, a concave chamber insert of conductive low atomic number material being inserted in said tube adjacent said eyepiece assembly and spaced therefrom by washers, an insulating sleeve being placed in said tube adjacent said concave insert, tubular formed capacitor means having alternate layers of conductive and insulative materials being inside said insulation means, a sleeve of conductive material being inside said capacitor means and in surface contact with the innermost conductive layer of said capacitor, a second conductor layer being grounded to said housing, said sleeve supporting at one end a conductive U-shaped frame which extends into the concavity of said insert, a fibre having an insulative material core having conductive particles applied to the surface thereof and having a resistance substantially higher than said frame resistance clinched at its ends to the legs of said frame, said sleeve at its other end having a transverse bar, an insulative flexible disc carrying a conductive charging pin in alignment with said bar being placed and hermetically sealed in said housing adjacent the sleeve and carrying said bar, with said disc being movable inwardly towards said bar until said pin makes electrical contact with said bar.

15. The apparatus of claim 14 having a second fibre composed of an insulative core and sputtered with larger amounts of metal than the first fibre so that it has a substantially lower resistance than said first fibre, said reticle having a scale for each of said fibres.

16. The apparatus of claim 14 having a second tubular housing of conductive low atomic number material, connected to said first housing, said second housing having a plurality of circular capacitors with corresponding conductive layers being electrically connected to the innermost conductive layer of the capacitor of the first condenser.

17. The apparatus of claim 16 having a concave insert of conductive low atomic number material adjacent the end capacitor of said second circular capacitors, a conductive sleeve being in said end capacitor and supporting a U-shaped conductive frame extending into the concavity to which is clinched an insulative fibre coated with a conductive material to a resistance substantially lower than the resistance of the first fibre, an eyepiece assembly being adjacent said concave insert for viewing against a reference mark the deflection of said fibre.

18. A radiation ratemeter comprising a tubular housing of conductive low atomic number material, an eyepiece assembly comprising an eyepiece lens, a reticle and an objective lens longitudinally spaced being inserted in said tube, said eyepiece lens being hermetically sealed in said tube, a concave chamber insert of conductive low atomic number material being inserted in said tube adjacent said eyepiece assembly and spaced therefrom by washers, an insulating sleeve being placed in said tube adjacent said concave insert, tubular formed capacitor means having alternate layers of conductive and insulative materials being inside said insulation means, a sleeve of conductive material being inside said capacitor means and in surface contact with the innermost conductive layer of said capacitor, a second conductor layer being grounded to said housing, a resistive collar being connected and adjacent said conductive sleeve, said collar supporting at one end a conductive U-shaped frame which extends into the concavity of said insert, a fibre having an insulative material core having metal particles applied to the surface thereof and having a resistance substantially equal to the frame resistance, said sleeve at its other end having a transverse bar, an insulative flexible disc carrying a conductive charging pin in alignment with said bar being placed and hermetically sealed in said housing adjacent the sleeve end carying said bar, with said disc being movable inwardly towards said bar until said pin makes electrical contact with said bar.

19. The ratemeter of claim 18 having a spring loaded button mounted transversely in said housing adjacent said frame, a conductive strip connecting said conductive sleeve and said spring-loaded button, said conductive member being flexible inwardly towards said frame upon pressure from said button to make electrical contact with said frame thereby bypassing said resistive collar and providing a condenser charge reading during a radiation reading.

20. The apparatus of claim 1 with a second fibre means being attached to a second frame means and having a resistance more nearly the same as the frame means resistance.

21. A ratemeter for detecting radiation comprising chamber means, frame means being situated in said chamber means, flexible means being connected to said frame means, means to place an electrical charge on said flexible means and said frame means to cause a force and separation therebetween of their free ends with radiation causing ionization in said chamber and current flow in said flexible means and frame means, resistive means subject to said current flow for providing a quasi-logarithmic response between the radiation rate and the deflection of said flexible means due to a potential drop across said resistive means, thereby varying the amount of ions attracted by said resistive means.

22. A ratemeter for detecting radiation comprising chamber means, conductive frame means situate in said chamber means, conductive fibre means being flexible and connected at each end to said frame means, said fibre and frame means having similar resistive values, radioactive voltage means for emitting a constant source of charged particles being connected to each end of said fibre and frame means to place said frame and fibre at a predetermined voltage thereby causing a repelling force and a predetermined separation therebetween, a resistance being connected between said frame means and said chamber means for limiting the maximum potential of said frame means.

References Cited in the file of this patent

UNITED STATES PATENTS

| 2,623,184 | Montgomery et al. | Dec. 23, 1952 |
| 2,638,552 | Laudsverk | May 12, 1953 |
| 2,736,817 | Bell | Feb. 28, 1956 |
| 2,742,577 | Henderson | Apr. 17, 1956 |
| 2,748,291 | Warmoltz | May 29, 1956 |
| 2,841,716 | Rich | July 1, 1958 |
| 2,842,674 | Barstad | July 8, 1958 |
| 2,884,533 | Richard-Foy | Aug. 28, 1959 |
| 3,067,331 | Hess et al. | Dec. 4, 1962 |

FOREIGN PATENTS

| 700,523 | Great Britain | Dec. 2, 1953 |
| 708,728 | Great Britain | May 12, 1954 |